April 18, 1939.  W. A. HEYMAN  2,154,447
COFFEE PRODUCT AND METHOD OF PRODUCING THE SAME
Filed Nov. 27, 1935
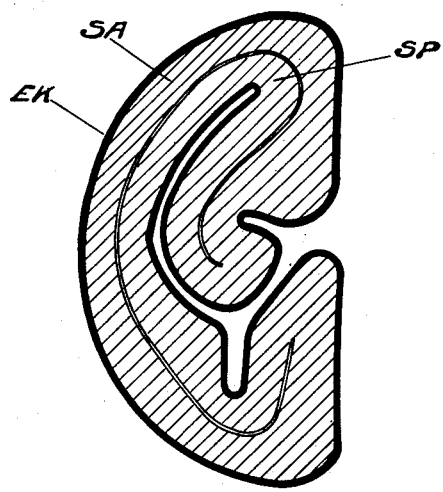
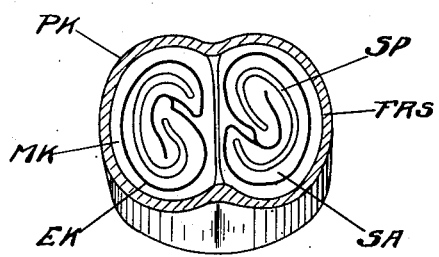
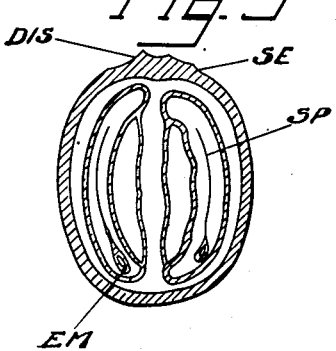
INVENTOR.
WILBERT A. HEYMAN
BY
ATTORNEY.

Patented Apr. 18, 1939

2,154,447

UNITED STATES PATENT OFFICE 2,154,447

COFFEE PRODUCT AND METHOD OF PRODUCING THE SAME

Wilbert A. Heyman, New York, N. Y.

Application November 27, 1935, Serial No. 51,825

9 Claims. (Cl. 99—65)

This invention relates to beverages, and one of the objects of the invention is to provide a new and improved coffee product and a new and improved process for producing the same.

More particularly my invention contemplates the production of a new and improved coffee product in which the infusion used as a beverage is freer from the objectionable constituents of ground roasted coffee than has obtained in coffee products hitherto produced.

Another object of the invention is to produce a coffee product which will retain its desirable aroma and flavor for a longer period than in similar products hitherto produced.

Another object of the invention is to produce a new and improved coffee product such that when a beverage infusion is produced therefrom the latter will retain its desirable aroma and flavor for a longer period in the urn, pot or other receptacle from which the infusion is to be dispensed.

A still further object of the invention is to provide a coffee product in which the packaging of the product for local consumption is greatly facilitated and made more economical than has been obtained in the packaging operations now in common use.

The invention consists in the new article of manufacture and in the several steps of my process of producing the same and the relation of each of said steps to the other thereof.

Before proceeding to describe particularly my improved product and the process I employ for producing said product, it might be useful to those skilled in the art for me to give a brief outline of the character and constituents of the coffee bean itself, and also of the chemical and physical changes in the coffee bean when the latter has been fermented, dried and roasted to prepare the said bean for grinding to the form commonly employed in preparing the coffee beverage.

The coffee tree is scientifically known as *Coffea arabica*. The plant belongs to the sub-kingdom of plants known as angiosperms which means that the plant reproduces by seed which are enclosed in the ovary. This sub-kingdom is divided into two classes. The basis for this division in the number of leaves (two) which develop from the seed, therefore the name Dicotyledoneæ. This class is separated into a sub-class because the flower of the coffee is all in one piece forming a tube shaped arrangement and is therefore named Metachlamydeæ. Next comes the division known as order and coffee belongs to the order "Rubiales" which is finally separated into the family known as Rubiaccæ or "madder". To the madder family also belong the Cinchona tree supplying the bitter principle quinine and the ipecacnanha which produces ipecac which is an emetic and purgative.

When the flowers of the coffee tree droop there appears what is commercially known as the coffee berry. Botanically speaking the proper name is drupes exemplified by the cherry or peach. In the course of six or seven months the drupes develop into little red balls ellipsoidal in shape, each drupe containing two locules, each having a little "stone", which is the seed and its parchment covering known as the endocorp, from which the coffee bean is obtained. Surrounding this stone is a pulpy substance known as the "sarcocarp" which is removed to procure the beans. Two wet, slimy seed packets are then obtained, which are then fermented and dried so that the endocorp or parchment covering is easily cracked open and removed. At the same time the parchment is removed a thin silvery membrane known as the spermoderm or silver skin is left in the cleft or groove of the coffee bean. There are many varieties of coffee source of which are the *Coffea arabica*, *Coffea liberica*, *Coffea robusta*, and many other hybrids have been produced from these main varieties. Each type of plant produces coffee berries which on roasting produce a flavor peculiar to its own classification, and in some cases chemical analysis show a considerable difference in the quality of those substances which can be quantitatively determined. For example in Madagascar and the Cowaro Islands have been found coffee devoid of caffeine but which contained such a great amount of a bitter substance known as cafamarine that the infusion was unfit for use.

Some coffee grown in Porto Rico is quite low in caffeine content. However, the bitter substance is equal to that in other types of coffee.

The coffee bean is the embryo and its food supply. The embryo is that part of the seed which, when supplied with food and moisture, develops into a new plant. The embryo of the coffee is very minute and the greater part of the seed is taken up by the food supply consisting of hard and soft endosperm. Embedded in the soft endosperm is the embryo consisting of the cotyledan and the radicle and stem or small root.

The endosperm consists of small cells in the outer part and large cells frequently as thick as 100 $\mu$ in the inner part. Certain of the inner cells have mucilaginous walls which when treated with water disappear, leaving only the middle lamellæ. The cells contain no starch, the reserve food supply being stored cellulose, protein and aleurone grains. Various investigations report the presence of sugar, tannin, iron, salts and carreine.

When green coffee is examined under the microscope, quantities of oil droplets may be easily distinguished in the cells which are absent in the roasted beans.

The acids of coffee are generally termed caffetannic acid. No definite knowledge has been determined and various researches give various formulas:

H. Lasiwetz, $C_{15}H_{18}O_8$  Griebel, $C_{18}H_{24}O_{10}$
Richter, $C_{30}H_{18}O_{16}$  Casenenve, $C_{21}H_{28}O_{14}$ H. Gorter says caffetannic acid is really a mixture which has among its constituents chlorogenic acid ($C_{32}H_{38}O_{19}$) which is not a tannic acid and coffalic acid. The fat of the coffee contains a certain percentage of free fatty acid. No absolute method for analysis of the supposed caffetannic acid has been devised. Therefore the significance of caffetannic acid is purely problematical.

I have discovered, however, that the acidic properties of coffee are highly volatile and are to a large extent driven off when the liquid extract is dried under vacuum, and it is this loss of not one, but various acids which causes the great loss of flavor of the dry soluble coffee extract.

In addition to caffeine there is another alkaloid in coffee known as Trigonellin or cafferine. This substance is also found in fenugreek. Analysis showed .23% of this substance present.

Gorter says that caffeine exists in coffee in combination with chlorogenic acid as a potassium chlorogenate $C_{32}H_{36}O_{19}K_2(C_8H_{10}O_{12}N_4)_2+2H_2O$. A fair average caffeine content of coffee is 1.5%, but some such as *C. canephora* coffee contains 1.97% while *C. maucetiona* coffee contains only .07% and *C. humboltiana* which contains no caffeine but a bitter principle known as cafemarine.

Other coffees devoid of caffeine are *C. gallienii*, *C. bonnieri*, *C. mogeneti*, and also a Congo coffee. Apparently the variation in caffeine is largely due to the genus of the tree, the nature of the soil and the climatic conditions.

The flavor of coffee has never been definitely analyzed. It is still unknown. Bernheimer has reported the presence of caffeine, coffeol, acetic acid, guinol, methylamine, acetone, fatty acids and pyrrol in the distillate coming over from roasting coffee. The coffeol was found to be a methyl derivative of solegenin.

Jeackle found considerable quantities of caffeine, furfurol, acetic acid, ammonia, trimethylamine and formic acid.

Erdman distilled roasted coffee with super heated steam and found valeric acid (alpha methylbutyric acid) furfurol alcohol and a number of phenols. The fractions containing the characteristic odorous constituents of coffee boiled at 93° under 13 mm. pressure, only a .89 gram was produced from 65 kilos of coffee.

Pyridin was shown to be present in coffee by Betrand and Weis Weiller and as much as 200 to 500 milligrams of this poisonous substance has been recovered from 1 kilogram of freshly roasted coffee.

Sayre considers the flavor of coffee to be derived from destructive distillations in which the carbonhydrates produce furfuraldehyde. The fats form acrolein, tannins produce catechol and pyrogallol and the proteins produce ammonia, amines and pyrrols.

The products of roasting inter-react to produce many compounds of varying degrees of complexity and toxicity. Therefore the coffeols of no two coffees may be said to be the same as evidenced by the characteristic aroma and flavor of each kind of coffee. The green coffees differ in composition and certainly roasting would not result in a uniform rearrangement. Also, the volatile products in roasted coffee occur in such small amounts that the ascertaining of their percentage relationships and the recognition of all that are present are not possible with the methods of analysis at present at our disposal.

Coffee contains fat ranging from 12% in the green to 20% in the roasted. This fat when purified has been found to be without odor. On saponifying, Meyer found it to consist of glycerol and acids as follows: carnaubic 10%, daturnic 1 to 1½%, palmitic 25 to 28%, capric .5%, oleic 2%, linoleic 50%. Unsaponifiable wax amounted to 21% of the total petroleum ether extract.

The cellulose in coffee is of a very hard and horny character in the green bean but it is made softer and more brittle during the roasting process. The roasting process changes some of the carbohydrates into caramel and other decomposition products which form the principal coloring matter in a coffee infusion. The pentosans form furfuraldehyde one of the important components of the coffeol. During the course of roasting and subsequent cooling the various decomposition products interact and polymerize and form aromatic tar-like materials which play an important role among the delicate flavors of coffee.

The production of carbon monoxide indicates that some reducing action takes place which accounts for the furfuryl alcohol. On the other hand oxydizing action takes place on the outer portion of the bean to form carbonic acid gas and to oxidize the caffetannic acid present there.

As explained hereinbefore, the coffee berry consists of first, the inner germ or embryo cells which, with proper conditions of moisture and temperature, sprout to form the plant, surrounding this are soft endosperm cells which are quite large in size but the cell walls, particularly after being roasted are relatively soft. Surrounding this inner endosperm is the outer and harder endosperm, whose cells are relatively smaller in size, but whose cell walls are relatively very much harder.

I find that when the coffee bean is roasted and ground to the proper size, depending upon the method of preparing the infusion, that regardless of the type of mill employed, the soft inner endosperm, and relatively much softer embryo, is crushed to a finer consistency than the harder outer endosperm.

I separate these various sized particles in order to divide them into their various classification, and I find that the embryo, and soft endosperm surrounding the embryo, is richer in mineral salts, and certain of the organic substances than I find in the harder endosperm. For example, the inner portions which are crushed into a fine powder are relatively higher in ash, caffeine, pyridine, bitter substances, malodiferous substances and objectionable flavor than the outer and harder endosperm.

I find that the aroma of this inner portion is extremely objectionable and of an entirely different character and of a vastly inferior quality to the aroma of the harder cellular portion.

I find that the gas content of both carbon dioxide and carbon monoxide is very much lower than the gas content of the outer endosperm.

On the preparation of an infusion of this inner endosperm with hot water, I find that the beverage is extremely bitter and very difficult to swallow. I find that it causes nausea and digestive disturbances, which makes it almost impossible to drink an entire cup of coffee made with that substance. I find that the flavor of the infusion is very objectionable, resulting in an uncontrollable desire to spit out the infusion without swallowing it. I find further that the aroma of the infusion made from this substance is vile, obnoxious and repellent to such an extent that it seems to burn the mucous membrane of the nose when at the usual temperature resulting from adding boiling hot water.

I find that on keeping this already objectionable substance for a very short time exposed to the air that it becomes even more objectionable due to the oxidation of the unsaturated free fatty acids contained therein, and due to the absence of the finer aromatic principles which, in ordinary coffee, tend to hide these objectionable impurities. In fact, in ordinary coffee, when the volatile flavors have escaped, these substances which are already present stand out more prominently and cause the coffee to appear rancid and unfit for use before actual rancidity takes place.

I find that the organic chemical substances contained in these inner and softer endosperm and embryo cells are poisonous, causing distressing physiological conditions and accelerated heart action.

I further find the harder and outer endosperm cells on roasting become quite brittle and during grinding form irregular shape, but uniform size particles. These particles, due to the hardness of their cell walls, retain the carbon dioxide and carbon monoxide gases which are protective gases, and which aid in keeping the oxygen of the air away from the delicate flavoring substances contained within the cells. I further find that the exquisite aroma of the coffee is contained also within this portion of the ground particles, and the aroma of this portion of the bean is exquisitely pleasant and appetizing and inviting. I find that this portion of the roasted and ground coffee will remain fresh and sweet for a very much longer period of time without the necessity of packing in vacuum. I also find that an infusion made in the usual manner for the preparation of a beverage from this part of the coffee is relatively free from bitterness, delicious to taste, easy to swallow, refreshing and stimulating and without harmful disturbances. I further find that it is possible to drink more of the beverage made from this portion of the bean without any harmful effects than can be consumed from the ordinary coffee without these harmful impurities removed.

I further find that infusions made with this harder endosperm remain fresh and good longer in the urn after it is made, due to the absence of objectionable impurities.

In the accompanying drawing wherein I have illustrated the relation of the endosperm and embryo of a coffee bean with relation to the other parts thereof, Figure 1 is a cross sectional view of a coffee bean showing the folded endosperm with the hard and soft tissue, Figure 2 is a cross sectional view of a coffee berry, enlarged better to illustrate the construction thereof, and Figure 3 is a longitudinal section of a berry also made upon an enlarged scale.

Referring now to the drawing wherein similar reference characters refer to similar parts throughout the several views thereof and particularly to Figures 2 and 3 which show respectively a transverse and longitudinal cross section of a coffee berry, the reference character PK illustrates what is known as the outer pericarp of a coffee bean. The character MK indicates the endosperm of said bean. The spermoderm of the coffee bean is indicated by the reference character EK and the reference character SA denotes the hard endosperm of the bean. The soft endosperm is indicated by the reference character SP.

The reference character SE indicates what remains of the sepals after the coffee bean has matured from the flower and the reference character EM designates the embryo, there, of course, being two embryos in each coffee bean, one located in each of the halves into which the coffee bean divides when freed of its outer coating.

In carrying out my improved process, I first roast the coffee bean as usual. I preferably grind the roasted bean to what is termed a "cracked" condition. This is a very coarse grind. This operation I find crushes a portion of the softer endosperm and embryo to a powdered condition. I next sift out the crushed soft endosperm and the crushed embryo cells, which, because of their relative softness, have been reduced to powdered form by the harder outer cells during the grinding operation. I perform this operation using a wire screen preferably having a 36 mesh, using preferably a wire having a gauge of 34. I find that approximately 1½% to 12% of the coffee passes through the screen in this operation, depending upon the size to which it is crushed. These screenings, I find contain the major part of the objectionable constituents of the coffee bean such as organic and inorganic salts, caffeine, caffe-tannic acid, cafemarine which is a bitter poisonous principle of the coffee, and pyridine which is also a poisonous substance contained in the coffee as hereinbefore pointed out.

I also find that this portion of the coffee contains the major portion of the fatty acids which later become oxidized and cause a rank flavor due to rancidity which is so well known to be highly objectionable and poisonous.

I then grind the "cracked" coffee to such size as is required to make the particular infusion desired. After which grinding I may again screen the coffee whereby to remove a further part of the objectionable constituents which have not been removed by the first grinding and screening operation, but in these successive grinding and screening operations, some portions of the harder and unobjectionable constituents of the coffee will pass through the screen. Another method of removing the softer endosperm is as follows:—I first grind the green coffee to the size of particles I wish, taking into consideration the fact that on roasting they increase in size, I screen this so that it is uniform of size and therefore practically uniform in particle weight. I separate this size which is larger than the size of the particles I wish to have and regrind it until it is all uniform. Due to the hardness of the unroasted green coffee bean and also due to its horny nature it does not form any appreciable amount of dust or fine particles when ground, but can be ground to a uniform size. I then roast this finely ground green coffee, preferably with indirect heat so that the flame will not scorch or char any of the coffee. By controlling the temperature and volume of the hot air current I am able to secure a more uniform roast than can be secured when the unground green coffee beans are roasted, because the heat penetration is more uniform due to the small particle size and the comparatively small distance from the outer surface of the granule to the center of the same. Less time is required for roasting and therefore a greater quantity of coffee can be roasted with the same equipment, in a given time. A lower heat is required resulting in a finer flavor.

I further find that this coffee will keep fresh longer and retain its gaseous content because in grinding roasted coffee the pressure of the mills against the coffee forces out some of the volatile gases and the volatile flavoring substances which give coffee its fine characteristic flavor and aroma. I find that more flavor is retained in the coffee with the result that less coffee is required to make a good cup with this product than with ordinary coffee which has been roasted and then ground.

After I roast the ground green coffee I then place it in a revolving cylinder, preferably of wood. I then rotate the cylinder so that the softer endosperm will be ground off of the individual particles of coffee by the harder portion. From time to time I can test the amount of the dust which has been formed and in that manner I can control the percentage of softer endosperm which I wish to remove. If a sufficient amount has not been removed, I continue the revolving process until I have removed the desired amount as determined by the cup test of both the refined coffee and the impurities removed. This grinding process does not crush the cells of the hard endosperm and does not disturb the status quo of the flavoring substances and protective gases within the hard cells.

I have found that with the finest known type of coffee mill that the least amount of dust I can secure with a No. 1 grind is 16½% while with the ordinary mills this size of grind commonly termed a "C" grind yielded over fifty percent of dust. These large quantities of fine material contain much of the hard endosperm which I wish to retain in the finished coffee but which with the ordinary mill I am unable to control.

I find that the coffee particles increase in particle size when roasted due to the formation of gaseous pressures within the cells, therefore I grind the green coffee to a smaller size than the size of the roasted coffee particles which I wish to secure. If desired, when this roasted coffee prepared as above has been screened, I may again grind the larger particles to reduce them to the desired usable size.

It will accordingly be seen that I have provided a new coffee product and process of producing the same which attains, among others, all the ends and objects above pointed out in a most facile manner.

I discovered that minute amounts of inorganic as well as organic salts tend to make coffee infusion flat. I find that the inner endosperm and embryo contain relatively large quantities of these substances and when they were removed the coffee infusion is much better tasting.

I find that liquid coffee made from this purified coffee substance will remain fresh and natural in flavor indefinitely, and can be sold in suitable containers as an article of commerce for use in the preparation of hot or cold beverages or for flavoring purposes. I prefer to pack it in vacuum to prevent the change in fine delicate flavor and aroma. The beverage made from this liquid coffee is milder in flavor, and has better keeping qualities than liquid coffee made from the entire ground roasted coffee bean, due to the absence of the objectionable and harmful impurities which are bitter, malodiferous and objectionable in flavor.

I find that the liquid infusion when dried to form a soluble dry coffee extract will make a beverage of much finer quality in flavor and aroma than the same product made from coffee which has not been so purified. It is free from the bitter cafemarine, lower in caffeine content, freed from the objectionable aroma and taste inherent in the impurities which have been removed.

The soft endosperm and embryo which I remove and which are those substances containing a higher percentage of bitterness, mineral content and particular flavor, may be used for other purposes, such as for flavoring ice cream, or candy or it may be mixed with soluble dry coffee extract for use in making a more concentrated product for flavoring purposes, or it may be ground with cocoa butter to make coffee coating.

The soft endosperm and embryo which have been removed may also be used for blending with other coffees in order to increase the body or oils which are absent or contained in a lesser degree in certain types of coffee. For example, medellin coffees are of a mild bland character, while longberry and Egyptian coffees and Javan coffees are of the heavy oily type. Therefore, these concentrated impurities may be removed from some types of coffee and blended in with other coffees to increase those characteristics lacking therein. For example, coffees for hotel trade are usually of the heavy type, while the home type coffee is usually the mild bland type. The impurities may therefore be used to blend in with the heavier types of coffees.

As many changes could be made in this construction without departing from the scope of the following claims, it is intended that all matter contained in the above description shall be interpreted as illustrative only and not in a limiting sense.

Having thus described my invention what I claim as new and desire to secure by Letters Patent is:

1. The herein described process of treating roasted coffee which comprises cracking the coffee bean whereby to pulverize the inner endosperm and embryo, screening the cracked product to eliminate the pulverized portion thereof, and then grinding the remainder of the product to the desired size.

2. The herein described process of preparing a coffee product which comprises cracking the coffee bean and at the same time pulverizing the inner endosperm and embryo and then removing the pulverized portion of the product by screening.

3. The herein described process of preparing a coffee product which comprises mechanically removing the inner endosperm and embryo of the coffee bean from ground roasted coffee.

4. The herein described process of preparing a coffee product which comprises grinding green coffee, roasting the same and then removing the softer parts consisting of the soft inner endosperm and embryo of the ground roasted coffee by a mechanical operation.

5. The herein described process of preparing a coffee product which comprises grinding green coffee, roasting said ground green coffee and then tumbling the ground roasted coffee in a cylinder whereby separating the softer parts thereof from said ground particles and then screening the mass of coffee so tumbled to separate the dust particles therefrom.

6. The herein described process of preparing a coffee product which comprises grinding green coffee to any desired size, roasting said ground green coffee, placing said roasted ground coffee in a revolving cylinder so that the softer parts of the coffee particles will be separated from the coffee particles by friction, screening the coffee so treated to remove the dust particles and then further grinding the larger particles to the desired size.

7. As a new article of manufacture, a ground roasted coffee product containing substantially all of the constituents of the roasted coffee bean except substantially all the inner endosperm and the embryo.

8. As a new article of manufacture, a liquid coffee infusion containing substantially all of the soluble constituents of roasted ground coffee beans except the inner endosperm and embryo.

9. As a new article of manufacture, a dry soluble coffee mixture composed of substantially all of the soluble constituents of roasted ground coffee beans except the inner endosperm and embryo.

WILBERT A. HEYMAN.